Sept. 20, 1949.  F. J. NAGEL  2,482,498

PHENOL-AMINE-FORMALDEHYDE RESIN

Filed May 10, 1946

WITNESSES:
E. G. McCloskey
J. H. Lapor

INVENTOR
Fritz J. Nagel.
BY Ezra W. Savage
ATTORNEY

Patented Sept. 20, 1949

2,482,498

UNITED STATES PATENT OFFICE 2,482,498

PHENOL-AMINE-FORMALDEHYDE RESIN

Fritz J. Nagel, Pittsburgh, Pa., assignor to Westinghouse Electric Corporation, East Pittsburgh, Pa., a corporation of Pennsylvania Application May 10, 1946, Serial No. 668,685

6 Claims. (Cl. 154—43)

This invention relates to resinous compositions, and in particular to resinous laminates characterized by excellent electrical and physical properties in combination with good post-forming characteristics.

Heretofore it has been necessary to produce different formulations or varieties of phenolic resins in order to best meet the requirements of each of the many particular applications therefor. If mechanical strength were the critical requirement in a given application, then a straight phenol-formaldehyde resin would usually be prepared. For electrical insulation applications certain aniline-formaldehyde resins or aniline-phenol-formaldehyde resins have been found to possess better resistance and dielectric insulation properties. For punching purposes, the straight phenolic resins have not been satisfactory and are modified for this purpose by incorporating an oil, such as tung oil, therein. These and other requirements of the trade have made it necessary in commercial practice to produce a wide variety of phenolic resins. However, each specie of phenolic resin was usually superior in only one feature and relatively inferior in one or more other basic properties. In consequence, often undesirable compromises had to be made if several requirements were to be fulfilled in a single use.

The object of the present invention is to produce a phenolic resin from which laminates having good post-forming properties combined with excellent electrical and mechanical properties may be prepared.

Other objects of the invention will in part be obvious and will in part appear hereinafter.

For a better understanding of the nature and objects of the present invention, reference should be had to the following detailed description and drawing, in which.

Figure 1:
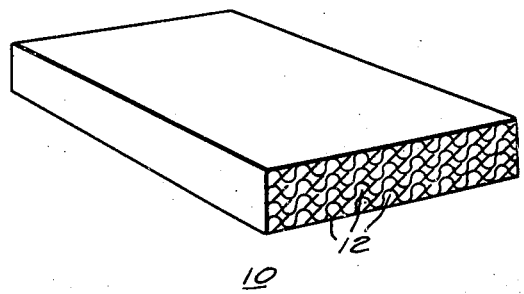
Figure 1 is a view in perspective partly in section.

According to the present invention, a single thermosetting phenolic type resin is prepared which has properties equal to the best features in many of the various phenolic resins made hereto. It is characterized by excellent physical properties and good punchability in combination with superior electrically insulating properties. Furthermore, this novel resin may be employed to produce laminates which may be post-formed under moderate heat and pressure after fully curing without blistering, swelling or otherwise deteriorating. Thus a single resinous composition is produced that is capable of meeting to an unexpected degree the diverse requirements of a great variety of applications, which at the present time are met by compromise in selecting one of a relatively large assortment of various phenolics of limited merit.

The resinous compositions of this invention are produced by reacting a phenol with a primary monoarylamine, a secondary diaryl monoamine and formaldehyde. The phenol may be hydroxybenzene, cresol, xylenol, cresylic acid, and similar homologues of phenol. The primary monoarylamine may be aniline, toluidine, xylidine, and similar homologues. Suitable diarylamines are diphenylamine, dinaphthylamine and ditolylamine. The formaldehyde may include one or more of aqueous solutions of formaldehyde, paraformaldehyde, and polyoxymethylenes or other polymers of formaldehyde In some cases anhydroformaldehydeaniline may be employed to furnish both the formaldehyde and aniline for the reaction.

For each 100 parts by weight of the phenol, the proportions of the amine ingredients in the reaction product may vary from 10 to 100 parts by weight of the primary monoarylamine and from 3 to 110 parts by weight of the secondary diarylmonoamine. In mole proportions, for each mole of phenol there is provided from about 0.1 to 1 mole of monoarylamine and from about 0.02 to .60 mole of diarylamine. The formaldehyde is supplied in an amount to provide from 0.8 to 1.5 moles of formaldehyde for each mole of both phenol and the diarylmonoamine and from 0.8 to 2.5 moles of formaldehyde for each mole of monoarylamine. Good results have been obtained by employing substantially one mole of formaldehyde for each mole of phenol and the two amines.

The reaction of the phenol, formaldehyde and the two amines is preferably carried out in the presence of an alkaline catalyst in an amount of from 0.1% to 2% or more. Suitable alkaline catalysts are hydrated lime, magnesia, barium oxide, aliphatic amines, ammonia and hexamethylenetetramine. Best results are obtained if the reaction is carried out with reflux and completed by vacuum removal of moisture developed during the reaction. Specific examples, in which all parts are by weight, of the preparation of the resinous composition are as follows:

*Example I*

Into a closed reaction vessel were introduced:

| | Parts |
|---|---|
| Cresylic acid | 333 |
| Aniline | 83 |
| Diphenylamine | 20 |
| Paraformaldehyde | 90 |
| Formaldehyde (40% solution) | 150 |
| Ethylenediamine | 3½ |

The ingredients were heated until refluxing started. Refluxing was continued for 1½ hours, after which the water was removed by evacuation to 40 mm. of mercury. The temperature reached a maximum of 110° C. as evacuation reached the desired degree. Thereafter 425 parts by weight of benzene were added to terminate the reaction and to dissolve the composition whereby a varnish was produced therefrom.

*Example II*

| | Parts |
|---|---|
| Phenol | 300 |
| Aniline | 124 |
| Diphenylamine | 36 |
| Formaldehyde (40% solution) | 250 |
| Ethylenediamine | 2 |

The mixture was reacted with application of external heat and allowed to reflux for one hour. Thereafter the water was removed by evacuation and the temperature allowed to rise to 110° C. 425 parts by weight of benzene were added to terminate the reaction and to produce an impregnating varnish.

*Example III*

Into a reaction vessel were placed

| | Parts |
|---|---|
| Phenol | 300 |
| Aniline | 60 |
| Diphenylamine | 150 |
| Paraformaldehyde | 90 |
| Calcium hydroxide | ½ |

Heat was applied to the mixture and the mixture allowed to reflux for ¾ of an hour. After removal of water from the vessel by evacuation, the temperature rose to 100° C. The reaction was terminated by adding 500 parts by weight of benzene. An impregnating varnish was produced.

*Example IV*

Into a suitable reaction vessel were placed

| | Parts |
|---|---|
| Phenol | 300 |
| Aniline | 90 |
| Diphenylamine | 20 |
| Formaldehyde (40% solution) | 320 |
| Ethylenediamine | 2 |

The mixture was heated and refluxed for ¾ of an hour. A temperature of 110° C. was permitted to be reached and then the hot liquid resin was poured into a tray to solidify and cool. The resulting brittle mass was pulverized and found to be suitable for use as a molding powder.

In the above examples, the evacuation could have been carried out to one millimeter of mercury or lower.

The solvents for the reaction products in the above examples may comprise various volatile organic solvents such, for example, as ethanol, toluene, isopropyl-alcohol, benzene, and mixtures thereof. The varnish solutions prepared may have resin solids content of as much as 50% or higher. Solutions of much lower resin content may be prepared to suit any particular application thereof.

The varnish solutions and the pulverized resins, as in Example IV, may be admixed with dyes, pigments, opacifiers, mold lubricants such as calcium stearates and waxes, and finely divided solids to provide for various applications. Finely divided graphite and molybdenum disulphide may be added if bearings are to be prepared from the resins. The resins may have incorporated therein finely divided alumina, bentonite, mica and similar inorganic solids to improve their resistance to wear, as in bearings for example.

Referring to Fig. 1 of the drawings there is illustrated a laminated member 10 comprising a plurality of sheets 12 of cloth or similar fibrous material impregnated and bonded with the resinous compositions of this invention. The sheets 12, after impregnation with the varnish compositions, such as produced in Examples I to III, and drying to remove the solvent, were superimposed and cured under heat and pressure to the infusible stage. Pressures of from 500 to 5000 pounds per square inch and temperatures of from 125° C. to 175° C. are suitable for producing laminated members. Cotton, silk, asbestos, cellulose acetate, glass fiber, and other woven, knitted, felted or braided sheet material may be used in preparing laminates by applying the resins of this invention thereto. Various paper materials used as kraft, alpha cellulose, asbestos, rice paper, press paper and the like may be used for making laminates.

The laminate shown in Fig. 1 has electrical properties equivalent to or better than those established for NEMA XX and XXX electrical grades and higher.

Figure 2:
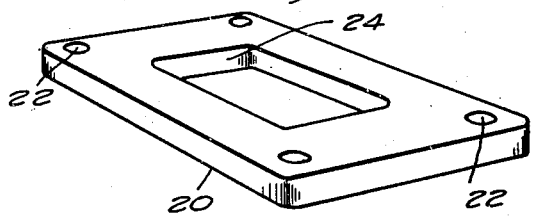
Fig. 2 is a view in perspective of a punched laminate.

Furthermore, the laminates will be found to possess hot punching characteristics equal to those possessed by tung oil modified phenol-formaldehyde laminates. Referring to Fig. 2 of the drawing, there is illustrated a typical punching 20 prepared from a laminate, such as 10 of Fig. 1. The laminate 10 of Fig. 1, for example, heated to 80° C. in an oven or oil bath may be readily punched with clean fracture surfaces into a compression gasket member at 20 shown in Fig. 2. The member will be found to have sharp, clean punched bolt holes 22 and a window 24. It will be found that there will be no splitting, cracking, chipping, or delamination, or other failure of the laminate. Numerous other complicated shapes may be readily punched from the compositions of the present invention.

The laminates of the invention, such as that shown in Fig. 1 are especially adapted to post-forming under heat and pressure. A flat sheet of the laminate may be heated in hot oil, a forced draft oven or under infrared heating lamps to a temperature of about 100° C. or higher and then placed in a die and may be readily shaped into a complex three dimensional member. Dish-shaped objects for instance may be easily pressed out of flat laminates, such as shown in Fig. 1. The pressures required for post-forming the laminates of this invention are relatively low, that is, of the order of 10 to 200 pounds per square inch depending on the thickness of the laminate and the complexity of the shape to be attained. Wood, plaster, low melting temperature alloys or even phenolic resin dies can be used in the operation.

It has been found that laminates of conventional phenol-formaldehyde resins combined with cloth or paper tend to blister in a few minutes when suspended in a forced draft oven. Some laminates show edge swelling as well. Prolonged heating accentuates these defects. With these previous laminates it is quite critical to time to a fraction of a minute the heat treatment to prevent the undesirable formation of defects. By contrast, the laminates of this invention, such as shown in Fig. 1 of the drawing, have been heated for much more than the period that conventional phenol-formaldehydes have been heated to without exhibiting any detrimental swelling.

A ⅛-inch thick laminate of cotton cloth and the resin of the present invention was suspended in an oven kept at a temperature of 225° C. by forced draft without showing any signs of blistering in 5 minutes. This time period has been found ample for commercial post-forming work.

Various physical tests, such as tensile strength and compression strength, have shown that the compositions of this invention are fully equal in physical properties to laminates prepared with straight phenol-formaldehyde resins. For example, 6½ oz. cotton drill treated with an equal weight of the resin of Example I had a fluxural strength of 27,000 p. s. i. flatwise and 30,000 p. s. i. edgewise and a flatwise compression strength of over 42,000 p. s. i.

Accordingly, the resins disclosed herein possess a combination of desirable properties that cannot be found in any single resinous composition known to the art heretofore.

Since certain changes in carrying out the above processes and certain modifications in the compositions which embody the invention may be made without departing from the scope of this invention, it is intended that all matter contained in the above description shall be interpreted as illustrative and not in a limiting sense.

I claim as my invention:

1. The resinous reaction product of 100 parts by weight of a phenol selected from the group consisting of hydroxybenzene, cresols, xylenols and cresylic acid, from 10 to 100 parts by weight of a primary monoarylamine, from 3 to 110 parts by weight of a secondary diaryl monoamine and an aldehyde selected from the class consisting of formaldehyde and its polymers, the aldehyde being present in an amount to provide from 0.8 to 1.5 moles for each mole of phenol and the diaryl monoamine and from 0.8 to 2.5 moles per mole of monoarylamine, reacted in the presence of an alkaline catalyst with refluxing and removal of water.

2. The resinous reaction product of 100 parts by weight of a phenol selected from the group consisting of hydroxybenzene, cresols, xylenols and cresylic acid, from 10 to 100 parts by weight of aniline, from 3 to 110 parts by weight of diphenylamine and an aldehyde selected from the class consisting of formaldehyde and its polymers, the aldehyde being present in an amount to provide from 0.8 to 1.5 moles for each mole of phenol and the diphenylamine and from 0.8 to 2.5 moles per mole of aniline, reacted in the presence of an alkaline catalyst with refluxing and removal of water.

3. A coating and impregnating composition comprising in combination a relatively volatile liquid carrier and the resinous reaction product of 100 parts by weight of a phenol, selected from the group consisting of hydroxybenzene, cresols, xylenols and cresylic acid, from 10 to 100 parts by weight of a primary monoarylamine, from 3 to 110 parts by weight of a secondary diaryl monoamine and an aldehyde selected from the class consisting of formaldehyde and its polymers, the aldehyde being present in an amount to provide from 0.8 to 1.5 moles for each mole of phenol and the diaryl monoamine and from 0.8 to 2.5 moles per mole of monoarylamine, reacted in the presence of an alkaline catalyst with refluxing and removal of water.

4. A coating and impregnating composition comprising in combination 100 parts by weight of a relatively volatile liquid carrier and 100 parts by weight of the resinous reaction product of 100 parts by weight of a phenol selected from the group consisting of hydroxybenzene, cresols, xylenols and cresylic acid, from 10 to 100 parts by weight of aniline, from 3 to 110 parts by weight of diphenylamine and an aldehyde selected from the class consisting of formaldehyde and its polymers, the aldehyde being present in an amount to provide from 0.8 to 1.5 moles for each mole of phenol and the diphenylamine and from 0.8 to 2.5 moles per mole of aniline, reacted in the presence of an alkaline catalyst with refluxing and removal of water.

5. A laminated member comprising, in combination, a plurality of sheets of fibrous material and a resinous binder applied to the sheets, the resinous binder comprising the reaction product of 100 parts by weight of a phenol selected from the group consisting of hydroxybenzene, cresols, xylenols and cresylic acid, from 10 to 100 parts by weight of a primary monoarylamine, from 3 to 110 parts by weight of a secondary diaryl monoamine and an aldehyde selected from the class consisting of formaldehyde and its polymers, the aldehyde being present in an amount to provide from 0.8 to 1.5 moles for each mole of phenol and the diaryl monoamine and from 0.8 to 2.5 moles per mole of monoarylamine reacted in the presence of an alkaline catalyst with refluxing and removal of water.

6. A laminated member comprising, in combination, a plurality of sheets of fibrous material and a resinous binder applied to the sheets, the resinous binder comprising the reaction product of 100 parts by weight of a phenol selected from the group consisting of hydroxybenzene, cresols, xylenols and cresylic acid, from 10 to 100 parts by weight of aniline, from 3 to 110 parts by weight of diphenylamine and an aldehyde selected from the class consisting of formaldehyde and its polymers, the aldehyde being present in an amount to provide from 0.8 to 1.5 moles for each mole of phenol and the diphenylamine and from 0.8 to 2.5 moles per mole of aniline, reacted in the presence of an alkaline catalyst with refluxing and removal of water.

FRITZ J. NAGEL.

No references cited.